United States Patent [19]

Dagnaud

[11] 4,263,975

[45] Apr. 28, 1981

[54] DEVICE FOR HIGH-SPEED BORING OF STEPPED POST-HOLES

[75] Inventor: Jacques Dagnaud, Pons, France

[73] Assignee: Societe de Gestion J-L. Biancone, France

[21] Appl. No.: 44,415

[22] Filed: Jun. 1, 1979

[30] Foreign Application Priority Data

Jun. 13, 1978 [FR] France .................... 78 17604

[51] Int. Cl.³ ............................................. E21B 7/26
[52] U.S. Cl. ...................................... 175/20; 175/84; 175/173; 175/251; 175/385
[58] Field of Search .................... 175/20, 19, 251, 249, 175/58, 385, 40, 162, 173, 84

[56] References Cited

U.S. PATENT DOCUMENTS

| | | | |
|---|---|---|---|
| 3,703,212 | 11/1972 | Abrahams | 175/173 |
| 3,817,337 | 6/1974 | Panak | 175/162 |
| 4,069,774 | 1/1978 | Lofgen | 175/40 |
| 4,105,081 | 8/1978 | Perrand | 175/385 |

FOREIGN PATENT DOCUMENTS

| | | | |
|---|---|---|---|
| 337721 | 6/1921 | Fed. Rep. of Germany | 175/173 |
| 2505299 | 8/1975 | Fed. Rep. of Germany | 175/20 |

Primary Examiner—William F. Pate, III

[57] ABSTRACT

The bottom annular flange of a bearing sleeve which is displaceable with respect to a support frame is applied against the ground surface around the zone of a hole to be bored. A cylindrical cutter placed around a boring mandrel attached to the operating rod of a jack is downwardly displaced only at the end of travel of the jack, driven into the ground with the boring mandrel and forms a cylindrical recess around the upper end of the bore-hole. The portion of soil which is trapped between the cylindrical cutter and the boring mandrel is removed automatically after simultaneous withdrawal of mandrel and cutter. A post can be driven into the bore-hole, cement or concrete being then poured into the cylindrical recess.

5 Claims, 2 Drawing Figures

DEVICE FOR HIGH-SPEED BORING OF STEPPED POST-HOLES

This invention relates to a device for high-speed boring of successive holes of small diameter and substantial depth in the ground in order to permit subsequent insertion of stakes or posts. The lower end of each hole consists of a calibrated bore having a cross-sectional area which is equal to that of the post whilst the upper end of each hole has an enlarged cross-section near the surface of the ground. After it has been fully engaged within its hole in its final position, each post can thus be securely maintained in position in order to pour around the post a suitable quantity of cement or concrete or any other suitable hardening agent.

The invention is more especially applicable to the boring of holes for posts which serve to support a horizontal wire stretched between the posts. One potential application thus consists in the attachment of a row of vines, the vine shoots being secured to the wire by means of suitable ties. However, the invention is also suited to other uses in which a large number of successive posts are usually required, especially for the erection of fences and the like. In all such applications, the invention permits of rapid boring and alignment of the corresponding holes in a reliable, regular and uniform manner, the total capital cost of the operation being appreciably lower than that of conventional methods of boring.

To this end, the device under consideration essentially comprises a support frame adapted to carry a bearing sleeve of generally cylindrical shape which is displaceable with respect to the frame in order to apply a bottom annular bearing flange against the ground surface around the zone of a hole to be bored. The device further comprises a solid and vertical axial boring mandrel attached to the end of the operating rod of a first jack mounted on the support frame, and a hollow cylindrical cutter which is coaxial with the boring mandrel and of small height in comparison with the length of said mandrel. The upper end of said cylindrical cutter has an inwardly projecting edge portion adapted to cooperate with an annular shoulder carried by the axial mandrel at a point of its length such that said annular shoulder causes displacement of the cylindrical cutter only at the end of travel of the mandrel under the action of the first jack. Said cylindrical cutter then penetrates into the ground with the boring mandrel in order to form at the upper end of the bore-hole a cylindrical recess which surrounds said bore-hole. The device also comprises means carried by the boring mandrel for removing the portion of soil which is trapped between the cylindrical cutter and the boring mandrel, the soil removal operation being performed after simultaneous withdrawal of mandrel and cutter.

In accordance with a distinctive feature of the device under consideration, the bearing sleeve is carried by the support frame by means of guide columns which are slidably mounted in said frame under the action of a second jack in such a manner as to ensure respectively that the bearing sleeve is applied against the ground surface or lifted on completion of the hole-boring operation.

In accordance with yet another distinctive feature, the support frame is carried by the frame of a transporting vehicle such as a farm tractor or the like so as to permit displacement of said support frame for successive boring of spaced holes. Said support frame is mounted on the vehicle frame for pivotal displacement about a transverse axis so as to permit of its upward withdrawal when the device is no longer in the service position.

In a preferred embodiment of the device according to the invention, the soil removal means are constituted by a transverse plate which extends within the interior of the cylindrical cutter between this latter and the boring mandrel. Said transverse plate is coupled to the bearing sleeve by means of a rigid connection so that removal of the portion of soil between cylindrical cutter and mandrel consequently takes place as a result of relative displacement of said cutter with respect to said bearing sleeve.

Finally and in accordance with a further distinctive feature, the first jack which actuates the boring mandrel is pivotally mounted within the support frame and provided at the upper end thereof with a lever which permits of azimuthal orientation of the boring mandrel, especially when the cross-section of said mandrel is not cylindrical but is square, for example, or of any different shape.

Further distinctive features of a device according to the invention for boring a stepped hole will now become apparent from the following description of one example of construction which is given by way of indication and not in any limiting sense, reference being made to the accompanying drawings, wherein.

Figure 1:
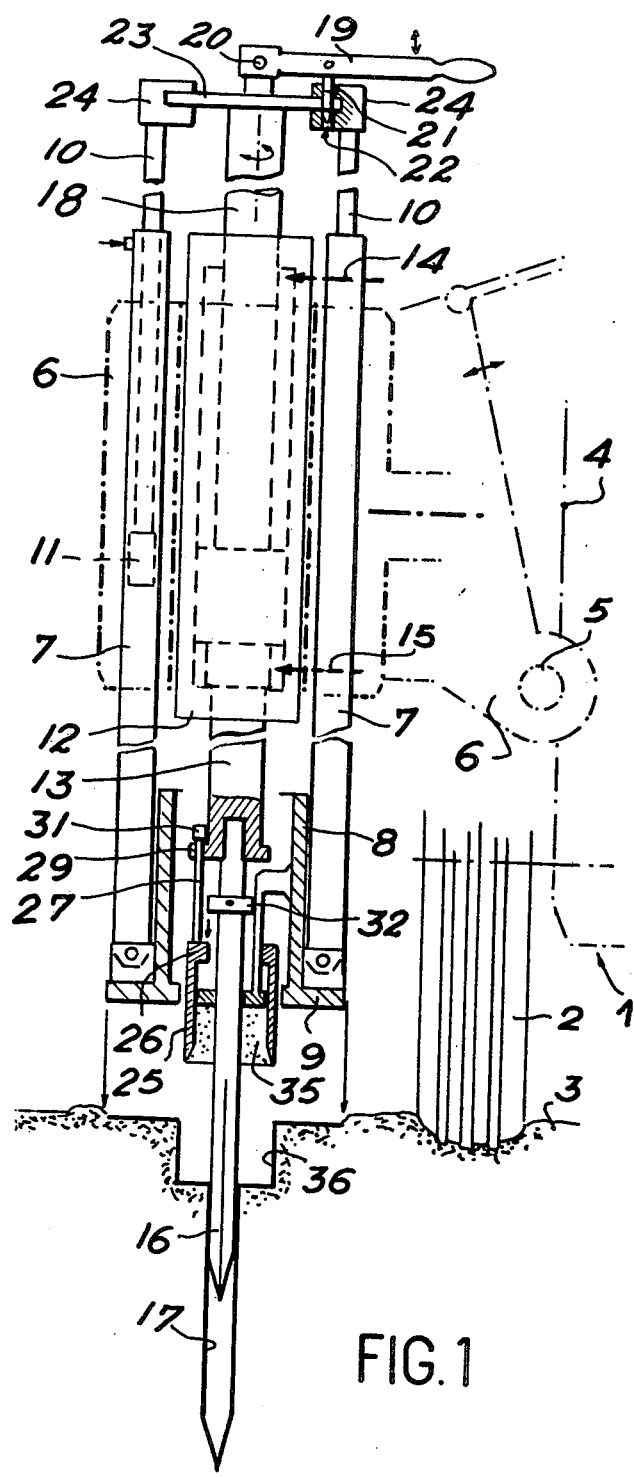
FIG. 1 is a schematic vertical sectional view of the device under consideration.
Figure 2:
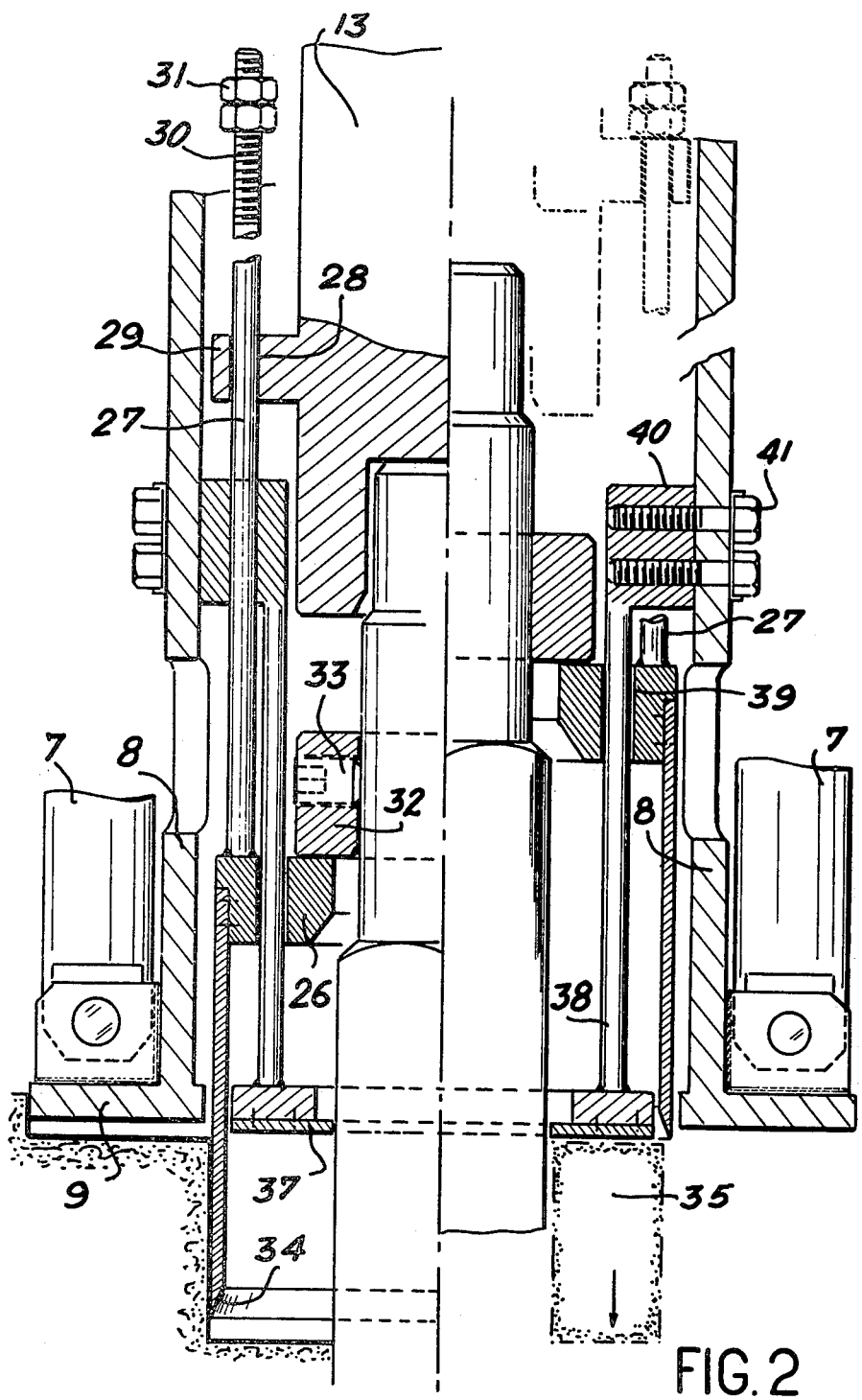
FIG. 2 is a sectional view to a larger scale in which the different constructional details of the device are more clearly brought out.

As shown in these figures, the reference numeral 1 designates schematically a transporting vehicle of the farm tractor type. Only one wheel 2 of the front wheel system is illustrated and bears on the ground surface 3. The frame 4 of said tractor is provided with a transverse shaft 5 on which is pivotally mounted a support frame 6 for the boring device in accordance with the invention. Said support frame is thus carried by the vehicle frame and capable of upward pivotal displacement when the device is not in service. On the other hand, in the position shown in the figures, the support frame 6 is displaced downwards in pivotal motion in order to be capable of boring stepped holes 17, 36 in the ground 3. Said holes have an enlarged cross-section in the vicinity of ground level in order to permit pouring of a layer of concrete or the like around each post after this latter has been placed within its hole, thus readily fixing said post in position.

There are slidably mounted on the support frame 6 two hollow and parallel columns 7 for supporting at the lower ends thereof a sleeve 8 provided with a flat transverse annular flange 9 which is intended to bear against the ground surface 3 around the zone in which a hole is to be bored. Displacement of the columns 7 and consequently either lowering or lifting of the bearing sleeve 8 which is associated with said columns with respect to the support frame 6 is carried out by means of a pneumatic jack or equivalent mechanism controlled from the tractor 1. In the example under consideration, said jack comprises two rigid and stationary rods 10 which are engaged within the columns 7 and provided with pistons 11 at the lower ends thereof.

Between the columns 7, the support frame 6 also carries another jack 12, the piston 13 of which can be caused to move either upwards or downwards by means of inlets 14 and 15 respectively for the admission of fluid under pressure. Said piston 13 is rigidly fixed to an axial mandrel 16 for forming the hole 17 to be bored in the ground 3 under the control action of the jack 12. Said jack is extended at the upper end by a rod 18 terminating in an actuating lever 19 which is pivotally mounted on said rod at 20. Said lever 19 in turn supports an anti-rotation locking-pin 21 which is normally engaged in a hole 22 of a transverse plate 23 carried by brackets 24 which are attached to the upper ends of the rods 10. Once it has been withdrawn from its hole 22, said lever 19 makes it possible in particular to displace the rod 18 and consequently the jack 12 and the axial boring mandrel 16 in pivotal motion and to produce the desired azimuthal orientation of this latter with respect to the axis of the borehole 17. The transverse plate 23 is advantageously provided with a plurality of holes 22 located at intervals around its periphery in such a manner as to define a predetermined position of locking of the lever 19 in respect of each hole 22.

In accordance with the invention, the boring mandrel 16 is associated with a coaxial cylindrical cutter 25 which surrounds said mandrel and the height of which is appreciably smaller than the total length of the mandrel. Said cylindrical cutter 25 is provided at the upper end thereof with an inwardly projecting edge portion 26 and with guide rods 27 which extend vertically from said edge portion 26. Said guide rods pass through a bore 28 formed in an annular shoulder 29 of the actuating piston 13, the projecting ends of said guide rods being each provided with a threaded portion 30 on which are screwed stop nuts 31. These arrangements are such that, in the raised position of the device, the nuts 31 are abuttingly applied against the annular shoulder 29 and stop the downward motion of the cylindrical cutter under the action of its own weight, with the result that said annular cutter remains suspended beneath the piston 13. By way of alternative, the jack 12 and its piston 13 can be replaced by a pneumatic hammer.

There is also mounted on the boring mandrel 16 a cylindrical ring 32 which is stationarily fixed by means of screws 33 for adjusting the height of this latter. Said cylindrical ring forms a bearing shoulder for applying the boring mandrel against the inwardly projecting edge portion 26 of the cylindrical cutter 25. The result thereby achieved is that, on completion of the movement of downward displacement of the mandrel 16 which carries out boring of the hole 17, the cylindrical ring 32 is abuttingly applied against the inwardly projecting edge 26 whilst the cylindrical cutter 25 is displaced with the boring mandrel 16 and in turn penetrates into the ground so as to cut a portion of soil 35 around the bore-hole 17. When the sleeve and mandrel have finally been withdrawn, a free cylindrical recess 36 is formed at the upper end of the bore-hole. By virtue of these arrangements, and once the boring mandrel and the cylindrical cutter have been withdrawn, the bore-hole 17 can readily receive a stake, post or the like (not shown in the drawings) which is suitably driven into the ground but the upper portion of which emerges to a suitable height. Said post is then securely fixed in position within the cylindrical recess 36 by pouring cement or concrete into said recess around the post, the quantity employed being just sufficient for this purpose.

After upward displacement of the boring mandrel 16 and of the annular flange, the device automatically removes the portion of soil 35 which is carried away between the sleeve and the mandrel. With this objective and in accordance with a distinctive feature of the invention, the apparatus further comprises a transverse plate 37 within the cylindrical sleeve 25, said plate being fixed at the end of vertical rods 38 so as to ensure a rigid connection between said plate 37 and the bearing sleeve 8. Said rods 38 are passed through a bore 39 formed in the inwardly projecting edge 26 and are capable of relative sliding motion, each rod being provided with a head 40 which is fixed in position opposite to the internal surface of the bearing sleeve 8 by means of screws 41.

The operation of the device according to the invention can readily be deduced from the foregoing description: when the tractor 1 and boring device carried by this latter have been positioned above the zone in which a hole 17 is to be bored, the initial step of the operation consists in moving the sleeve 8 downwards until its annular flange 9 bears on the ground 3 around the region to be bored. In a second step, the jack 12 is actuated in such a manner as to ensure that the movement of travel of the jack piston 13 produces a downward displacement of the boring mandrel 16, thus forming the axial bore-hole 17. Prior to completion of the movement of travel, the cylindrical ring 32 which is fixed on the mandrel 16 in turn produces a downward displacement of the cylindrical cutter 25, thus forming the cylindrical recess 36 around the bore-hole 17. Once the components have reached the lower end of travel, the complete assembly is raised in order to remove the portion of soil 35 which is held between the cylindrical cutter 25 and the boring mandrel 16. In a second step, said portion of soil 35 is withdrawn by producing a relative displacement of the bearing plate 37 and of the cylindrical cutter 25 by means of a differential movement of the two jacks carried by the support frame 6.

The particularly simple and rugged boring device thus provided is well suited to the applications which are primarily contemplated, especially the erection of posts or stakes for rows of vines or fencing. The boring operation takes place at high speed and at a minimum cost of production while achieving perfect vertical positioning and alignment.

We claim:

1. A device for boring a stepped hole which is intended to receive a post or the like, wherein said device comprises a support frame adapted to carry a bearing sleeve of generally cylindrical shape which is displaceable with respect to the frame in order to apply a bottom annular bearing flange against the ground surface around the zone of a hole to be bore, a solid and vertical axial boring mandrel attached to the end of an operating rod of a first jack mounted on the support frame, a hollow cylindrical cutter which is coaxial with the boring mandrel and of small height in comparison with the length of said mandrel, said cylindrical cutter being provided at the upper end with an inwardly projecting edge portion adapted to cooperate with an annular shoulder carried by the axial mandrel at a point of its length such that said annular shoulder causes displacement of the cylindrical cutter only at the end of travel of the mandrel under the action of the first jack, said cylindrical cutter being then intended to penetrate into the ground with the boring mandrel in order to form at the upper end of the bore-hole a cylindrical recess which surrounds said bore-hole, and means carried by the boring mandrel for removing the portion of soil which is trapped between the cylindrical cutter and the boring mandrel, the soil removal operation being performed after simultaneous withdrawal of mandrel and cutter, the soil removal means being constituted by a transverse plate which extends within the interior of the cylindrical cutter between said cutter and the boring mandrel, said plate being coupled to the bearing sleeve by means of a rigid connection so that removal of the portion of soil between cylindrical cutter and mandrel consequently takes place as a result of relative displacement of said cutter with respect to said bearing sleeve.

2. A device according to claim 1, wherein the bearing sleeve is carried by the support frame by means of guide columns which are slidably mounted in said frame under the action of a second jack in such a manner as to ensure respectively that the bearing sleeve is applied against the ground surface or lifted on completion of the hole-boring operation.

3. A device according to claim 1, wherein the support frame is carried by the frame of a transporting vehicle such as a farm tractor or the like so as to permit displacement of said support frame for successive boring of spaced holes, said support frame being mounted on the vehicle frame for pivotal displacement about a transverse axis so as to permit of its upward withdrawal and orientation.

4. A device according to claim 1, wherein the first jack which actuates the boring mandrel is pivotally mounted within the support frame and provided at the upper end thereof with a lever which permits of azimuthal orientation of said boring mandrel.

5. A device for boring a stepped hole which is intended to receive a post or the like, wherein said device comprises a support frame adapted to carry a bearing sleeve of generally cylindrical shape which is displaceable with respect to the frame in order to apply a bottom annular bearing flange against the ground surface around the zone of a hole to be bored, a solid and vertical axial boring mandrel attached to the end of an operating rod of a first jack mounted on the support frame, the boring mandrel being actuated by a pneumatic or hydraulic hammer placed between the jack and the mandrel, a hollow cylindrical cutter which is coaxial with the boring mandrel and of small height in comparison with the length of said mandrel, said cylindrical cutter being provided at the upper end with an inwardly projecting edge portion adapted to cooperate with an annular shoulder carried by the axial mandrel at a point of its length such that said annular shoulder causes displacement of the cylindrical cutter only at the end of travel of the mandrel under the action of the first jack, said cylindrical cutter being then intended to penetrate into the ground with the boring mandrel in order to form at the upper end of the bore-hole a cylindrical recess which surrounds said bore-hole, and means carried by the boring mandrel for removing the portion of soil which is trapped between the cylindrical cutter and the boring mandrel, the soil removal operation being performed after simultaneous withdrawal of mandrel and cutter.

* * * * *